United States Patent
Mizuno et al.

(10) Patent No.: US 8,328,935 B2
(45) Date of Patent: Dec. 11, 2012

(54) METHOD OF MANUFACTURING POLYCRYSTALLINE SILICON ROD

(75) Inventors: Michihiro Mizuno, Niigata (JP); Shinichi Kurotani, Niigata (JP); Shigeyoshi Netsu, Niigata (JP); Kyoji Oguro, Niigata (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 596 days.

(21) Appl. No.: 12/418,165

(22) Filed: Apr. 3, 2009

(65) Prior Publication Data
US 2009/0269493 A1    Oct. 29, 2009

(30) Foreign Application Priority Data
Apr. 23, 2008 (JP) .................. 2008-112115

(51) Int. Cl.
*C30B 23/00* (2006.01)
*C30B 25/00* (2006.01)
*C30B 28/12* (2006.01)
*C30B 28/14* (2006.01)

(52) U.S. Cl. ............... 117/84; 117/88; 117/94; 117/97
(58) Field of Classification Search ............ 117/13, 117/84, 88, 94, 97
See application file for complete search history.

(56) References Cited

U.S. PATENT DOCUMENTS

| | | | |
|---|---|---|---|
| 4,255,463 A | 3/1981 | Rucha et al. | |
| 6,544,656 B1 * | 4/2003 | Abe et al. | 428/446 |
| 2003/0021894 A1 * | 1/2003 | Inoue et al. | 427/248.1 |
| 2004/0091630 A1 * | 5/2004 | Sonnenschein | 427/428.1 |
| 2004/0191973 A1 * | 9/2004 | Kawamura | 438/198 |
| 2006/0102068 A1 * | 5/2006 | Tsvetkov et al. | 117/89 |
| 2007/0169684 A1 * | 7/2007 | Stoddard | 117/13 |

FOREIGN PATENT DOCUMENTS

| | | |
|---|---|---|
| EP | 0 345 618 A2 | 12/1989 |
| EP | 0 345 618 A3 | 12/1989 |
| EP | 0 445 036 A1 | 9/1991 |

(Continued)

OTHER PUBLICATIONS

T. Iizuka, et al. "conversion Coefficient for IR measurement of Oxygen in SI", Defects in Silicon, Electrochem. Society, 1983, pp. 265-274.

(Continued)

*Primary Examiner* — James McDonough
(74) *Attorney, Agent, or Firm* — Oblon, Spivak, McClelland, Maier & Neustadt, L.L.P.

(57) ABSTRACT

The present invention is a method of manufacturing polycrystalline silicon rods, wherein silicon is deposited onto a silicon core wire by a chemical vapor deposition (CVD) method such that a silicon member, which is cut out from a single-crystalline silicon ingot at an off-angle range of 5 to 40 degrees relative to a crystal habit line of the ingot, is used as the silicon core wire. The single-crystalline silicon ingot is preferably grown by a Czochralski (CZ) method or floating zone (FZ) method, such that the ingot preferably has an interstitial oxygen concentration of 7 ppma to 20 ppma. Silicon rods produced by this method are less likely to suffer a breakage caused by cleavage during the growth process of polycrystalline silicon during CVD, and exhibit improved FZ method success rates. The polycrystalline silicon rods produced by this method also have low impurity contamination and high single-crystallization efficiency.

10 Claims, 3 Drawing Sheets

FOREIGN PATENT DOCUMENTS

| | | | |
|---|---|---|---|
| EP | 1 992 592 | A3 | 11/2008 |
| EP | 1 992 593 | A2 | 11/2008 |
| JP | 3-252397 | A | 11/1991 |
| JP | 7-315980 | | 12/1995 |
| JP | 2005-112662 | | 4/2005 |
| WO | WO 01/63027 | A1 | 8/2001 |

OTHER PUBLICATIONS

Search Report issued Dec. 1, 2010 in EP Application No. 09 00 4489.
Japanese Office Action issued in corresponding JP patent application No. 2008-112115 dated Mar. 6, 2012.

* cited by examiner

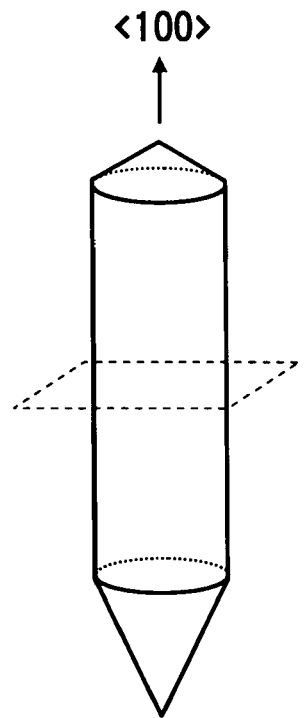
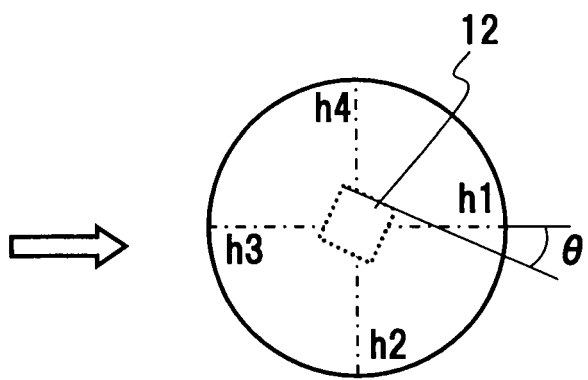
FIG.2A              FIG.2B
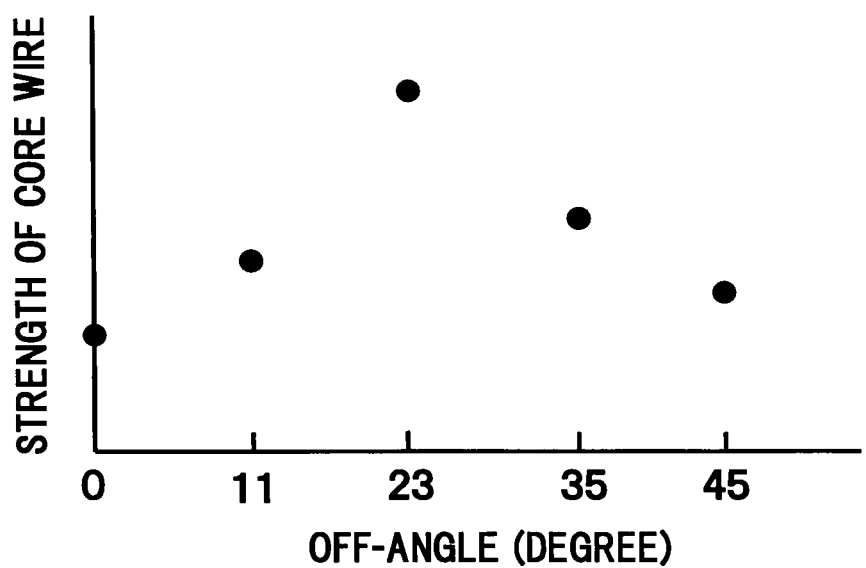
FIG.3

METHOD OF MANUFACTURING POLYCRYSTALLINE SILICON ROD

This application claims priority from Japanese Patent Application No. 2008-112115 filed Feb. 23, 2008, which is incorporated hereinto by reference in its entirely.

BACKGROUND OF THE INVENTION

1. Field of the Invention

The present invention relates to a method of manufacturing a polycrystalline silicon rod, and more specifically to a method of manufacturing a rod which is used in producing a very high-purity polycrystalline silicon by a CVD method.

2. Description of the Related Art

While a silicon substrate which is a major substrate for manufacturing semiconductor devices is fabricated largely by cutting and grinding a single-crystalline silicon ingot which is grown by a Czochralski method (hereafter abbreviated as a "CZ method"), the growing of such a single-crystalline silicon ingot is performed by melting polycrystalline silicon chunks charged in a quartz crucible, dipping a single-crystalline seed (seed crystal) of silicon into the silicon melt through the liquid surface thereof, gradually pulling up and cooling the seed crystal while rotating it.

The polycrystalline silicon chunks used as the raw material for such crystal growth are commonly manufactured by a chemical vapor deposition method (hereafter abbreviated as a "CVD method") and a typical of such method is "Siemens method". Specifically, that is a method in which a mixed gas of high-purity trichlorosilane ($SiHCl_3$: hereafter abbreviated as "TCS") and hydrogen is brought into contact with a thin, rod-like silicon core wire (a seed) which is kept at a high temperature in a reaction furnace by electric heating so that polycrystalline silicon is deposited on the surface of the silicon core wire.

The silicon material used as the above described silicon core wire is typically one which is cut off from a polycrystalline silicon rod or a silicon rod manufactured by a pedestal pulling method, and which is an established method (see, for example, Japanese Patent Laid-Open No. 2005-112662).

On the other hand, metal impurities and dopant impurities in the polycrystalline silicon which is the raw material for crystal pulling may be taken into a silicon ingot which is solidified from the silicon melt to be single-crystallized, thereby causing a deterioration of the quality (purity) of the single-crystalline silicon to be grown and a deviation from the initially specified resistivity.

Moreover, in recent years, large diameter silicon ingots are produced by a CZ method making it necessary that not only polycrystalline silicon chunks are charged before starting the pulling up of single-crystalline silicon, but also polycrystalline silicon chunks are recharged into the quartz crucible during the crystal pulling up.

In this respect, since most of the impurities brought into the silicon melt by polycrystalline silicon have a segregation coefficient of less than 1, the concentrations in the silicon melt will increase along with the progress of the pulling up of the single-crystalline silicon. As the result of increasing impurity concentrations in the silicon melt, the purity of the single-crystalline silicon portion grown from the silicon melt is decreased. This may result in that the merit of growing a long single-crystalline silicon ingot by recharging is sacrificed.

Thus, for the objective of further increasing the diameter of silicon ingot, the purification of polycrystalline silicon exceeding the level of current state-of-the-art polycrystalline silicon will be desired; however, conventional manufacturing methods of polycrystalline silicon rods have their limits in the view point of removing impurities. One factor of such limitations is the difficulty in controlling the impurities caused by the above described silicon core wire. For example, prior to the process of cutting out a core wire from a polycrystalline silicon rod, heat treatment at a high temperature is carried out, and impurity contaminations are likely to take place in such high temperature heat treatment.

Specifically, since a polycrystalline silicon rod immediately after CVD growth has strain in its crystal, if the rod is cut as it is to obtain a polycrystalline silicon for core wire, the rod will be broken during the cutting process. In order to prevent such breakage, the polycrystalline silicon rod is in some cases processed by heat treatment at a high temperature to remove internal strain, and is likely to be subjected to impurity contaminations from heat treatment furnace materials and the furnace environment during the process. Although, as the countermeasure to avoid such impurity contamination, there is a method to remove internal strain by heating and gradually cooling the polycrystalline silicon rod in the CVD reactor after growing the polycrystalline silicon therein, such method will increase the time period to occupy the CVD reactor thereby resulting in a decline in productivity.

For a polycrystalline silicon rod used in a floating zone method (hereafter abbreviated as an "FZ method"), which is, along with the CZ method, known as a growing method for single-crystalline silicon, improvement of so called "one-pass rate" has become a crucial issue as the diameter of a crystal to be grown increases. However, when polycrystalline silicon is used as the core wire to carry out a CVD process, the grain boundary size near the interface between the core wire and the polycrystalline silicon which grows on the surface of the core wire increases and, as the result of that, the single-crystallization rate in the FZ method declines leading to declines in yield and productivity.

It is noted that although there is a method in which a silicon rod produced by the pedestal pulling method is used as the core wire material, a silicon rod obtained by the pedestal pulling method is only partially single-crystallized and the entire silicon rod does not have a fixed crystal axis orientation. Therefore, even if crystal growth by an FZ method is carried out with the polycrystalline silicon obtained by using such a silicon rod as the core wire, the one-pass rate will remain to be low.

SUMMARY OF THE INVENTION

The present invention has been made in view of the above described problems suffered from conventional manufacturing methods of polycrystalline silicon rod, and an object of which is to provide a method to enable the manufacturing of a polycrystalline silicon rod which has a low impurity contamination (a high purity) unobtainable by conventional methods and a polycrystalline silicon rod for FZ which has a high single-crystallization efficiency.

In addition, it is also an object of the present invention to provide a method of manufacturing a polycrystalline silicon rod by use of a high-strength silicon core wire which is less likely to suffer a breakage caused by cleavage during the growth process of polycrystalline silicon by the CVD.

In order to solve the above described problems, the present invention provides a method of manufacturing a polycrystalline silicon rod by silicon deposition on a silicon core wire by a CVD method, wherein a silicon member which is cut out from a single-crystalline silicon ingot is used as the silicon core wire.

For example, the above described single-crystalline silicon ingot is grown by a Czochralski method (CZ method) or a floating zone method (FZ method), and the single-crystalline silicon ingot has a crystal growth axis orientation of <100> or <111> by a Miller index.

Preferably, the above described silicon core wire is cut out such that the side face of the core wire forms an angle in the range of 5 to 40 degrees with respect to the crystal habit line of the above described single-crystalline silicon ingot.

Further, preferably, the above described single-crystalline silicon ingot is grown by a Czochralski method (CZ method) and has an interstitial oxygen concentration of 7 ppma to 20 ppma.

The above described interstitial oxygen concentration is more preferably not less than 17 ppma.

The surface of the above described silicon core wire is preferably etched off by a removal amount of 50 μm to 200 μm after being cut out from the above described single-crystalline silicon ingot.

The silicon deposition by the above described CVD method is carried out in a mixed gas; the high-purity trichlorosilane (TCS) is vaporized, diluted with high-purity hydrogen, and introduced into the deposition reactor.

According to the present invention, since a silicon member (a single-crystalline silicon bar) which is cut out from the single-crystalline silicon ingot grown by a CZ method or an FZ method is used as the core wire when manufacturing a silicon rod, it becomes possible to provide a polycrystalline silicon rod which has a low impurity contamination (a high purity) unobtainable by conventional methods and a polycrystalline silicon rod for FZ which has high single-crystallization efficiency.

Further, since, in the present invention, the silicon core wire is cut out so as to have an off-angle in the range of 5 to 40 degrees with respect to the crystal habit line of the single-crystalline silicon ingot when a single-crystalline silicon ingot having a crystal growth axis orientation of <100> or <111> by the Miller index is used as the single-crystalline silicon ingot from which the core wire is to be cut out, it becomes possible to provide a method of manufacturing a polycrystalline silicon rod by using a high-strength silicon core wire which is less likely to suffer a breakage caused by cleavage during the growth process of polycrystalline silicon by CVD.

BRIEF DESCRIPTION OF THE DRAWINGS

FIGS. 2A and 2B illustrate the manner in which a core wire is cut out from a <100> single-crystalline ingot with an off-angle of a predetermined range with respect to the crystal habit line of the aforementioned single-crystalline ingot;

FIG. 3 summarizes the study result of an off-angle magnitude dependence upon the core wire strength;

DESCRIPTION OF THE PREFERRED EMBODIMENTS

Hereinafter, best embodiments for carrying out the present invention will be described with reference to the drawings.

As so far described, as long as a silicon material cut out from a polycrystalline silicon rod grown by a conventional method is used as a core wire, it is difficult to meet the demand for a higher purity of polycrystalline silicon chunks.

Accordingly, in the present invention, a silicon member (a single-crystalline silicon bar) which is cut out from a single-crystalline silicon ingot grown by a CZ method or an FZ method is used as the core wire when manufacturing a polycrystalline silicon rod by silicon deposition on a silicon core wire by a CVD method under a gas atmosphere for example made up of trichlorosilane (TCS) and hydrogen.

Detail research results have been already accumulated on the growth mechanism of a single-crystalline silicon by the CZ and FZ methods, and many research results have been reported on the impurity control (purity control) of the single-crystalline silicon ingot to be grown (see, for example, WO 01/063027 on the CZ method, Japanese Patent Laid-Open No. 7-315980 on the FZ method, etc.)

Therefore, with a single-crystalline silicon bar cut out from a single-crystalline silicon ingot, which is subjected to such a impurity control (purity control) as described above, being used as the core wire for silicon deposition, it becomes possible to significantly decrease the concentrations of metal impurities and dopants (B, P, etc.) in the resulting polycrystalline silicon rod.

While it is desirable that the core wire has a low dopant concentration of not more than $1 \times 10^{12}$ atoms/cc, particularly when manufacturing a polycrystalline silicon rod having a high resistivity of not less than 1000 Ωcm, such a high-purity core wire can be easily obtained by cutting out from a single-crystalline silicon ingot grown by a CZ or FZ method.

Moreover, while it is effective to increase the one-pass rate of an FZ method that the entire core wire for growing polycrystalline silicon has a fixed crystal axis orientation, a silicon rod obtained by a conventional pedestal pulling method cannot meet such demand. However, a silicon bar for providing a core wire is cut out from a single-crystalline silicon ingot grown by a CZ or FZ method in the present invention, therefore, the entire core wire will have a fixed crystal axis orientation and the above described one-pass rate can be improved.

Figures 1A, 1B, 1C, 1D, 1E:
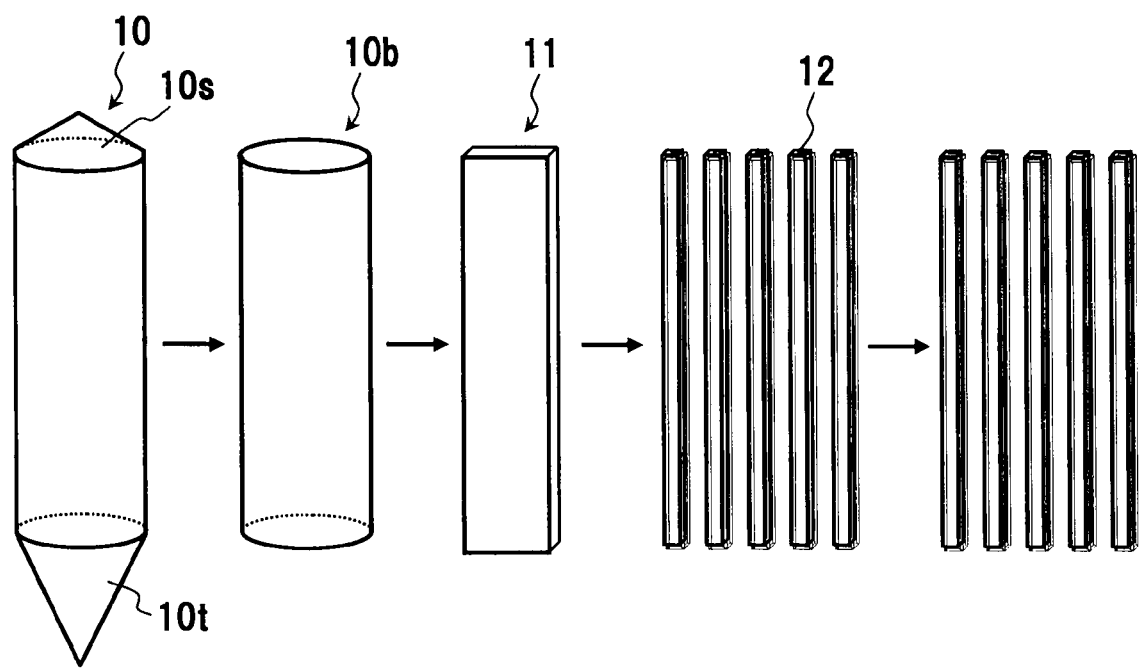
FIGS. 1A to 1E illustrate the manner in which a single-crystalline silicon bar to be used as a core wire is cut out from a single-crystalline silicon ingot.

FIGS. 1A to 1E illustrate the manner in which a single-crystalline silicon bar to be used as a core wire is cut out from a single-crystalline silicon ingot, in which the cutting out of a core wire from a single-crystalline silicon ingot grown by a CZ method is shown. First, a single-crystalline silicon ingot 10 is prepared (FIG. 1A), and a shoulder portion 10s and a tail portion 10t thereof are cut off to obtain a body portion 10b (FIG. 1B). A planar silicon 11 is cut out from the body portion 10b (FIG. 1C), and is further cut into thin rectangles to obtain a silicon bar (core wire) 12 (FIG. 1D). It is noted that the surface of the core wire thus cut out is preferably subjected to an etching process for the purpose of removing residual strain generated during the cutting process (FIG. 1E). The removal amount in the aforementioned process may be for example in a range of 50 μm to 200 μm. A mixed solution of hydrofluoric acid and nitric acid may be used for the aforementioned etching.

It is noted that although in the viewpoint of general availability the single-crystalline silicon ingot from which a core wire is to be cut out preferably has a crystal growth axis orientation of <100> or <111> by the Miller index, any orientation of other Miller indices can be used.

In this respect, when a single-crystalline silicon ingot having a crystal growth axis orientation of <100> or <111> by the Miller index as the single-crystalline silicon ingot from which a core wire is to be cut out, the silicon core wire is preferably cut out so as to have an off-angle in the range of 5 to 40 degrees with respect to the crystal habit line of the single-crystalline silicon ingot. Which is based on the finding obtained from the investigation by the present inventors that the strength of the silicon core wire can be increased by cutting out the silicon core wire at the aforementioned off-angle.

More specifically, it is well known that since a single-crystalline silicon has a so-called "cleavage plane", it is brittle against a pressure in a particular direction. Particularly, the <111> plane is subject to "slip" (fracture along a cleavage plane) and when such slip takes place during the process of growing polycrystalline silicon by CVD, an accident may happen that the core wire falls down within the reactor.

The present inventors have researched into the above described problems to find out that cutting out the core wire so as to be inclined (with an off-angle) within a predetermined range with respect to the crystal habit line of the single-crystalline silicon ingot will make the above described slip to be less likely to occur thereby preventing the growing polycrystalline silicon from falling down.

FIGS. 2A and 2B illustrate the manner in which a core wire is cut out from a single-crystalline silicon ingot, of which crystal growth axis orientation is <100>, with an off-angle of a predetermined range with respect to the crystal habit line of the aforementioned single-crystalline silicon ingot, in which FIG. 2A is a general view of the ingot and FIG. 2B is a sectional view taken along the virtual plane shown by dotted lines in FIG. 2A. In the case that the crystal growth axis direction is <100>, there are four crystal habit lines (h1 to h4), and a silicon bar (core wire) 12 is cut out such that the side face thereof forms an off-angle θ in a predetermined range with the crystal habit line. The off-angle θ in this arrangement is preferably in the range of 5 to 40 degrees as described below.

It is also noted that since such off-angle has a technical significance in specifying Miller indices of the crystal plane corresponding to the surface of the silicon bar (core wire), in addition to the above described methods for controlling the cutting-out angle of the core wire, any method of specifying an appropriate orientation of the seed crystal used when growing a single-crystalline ingot by a CZ or FZ method may be used.

Further, in a single-crystalline silicon grown by a CZ method, it is known that oxygen atoms of which source of supply is the quartz crucible are taken into between crystalline lattices thereby exhibiting strength-enhancing effects such as suppressing dislocation generation, and therefore cutting out the core wire used in the present invention from a single-crystalline silicon ingot having, for example, an interstitial oxygen concentration of 7 ppma to 20 ppma will make it possible to ensure the strength of the core wire. According to a study by the present inventors, an interstitial oxygen concentration of not less than 17 ppma will enable to achieve an enough core wire strength.

Hereinafter, the present invention will be described in more detail by way of examples.

Example 1

A single-crystalline silicon, of which crystal growth axis orientation is <100> and which is non-doped (containing no dopant such as P and B), was pulled up by a CZ method. The interstitial oxygen concentration ($[O_i]$) of the silicon was measured by Fourier transform infrared spectroscopy, and it was revealed that $[O_i]$ is largely constant with respect to the crystal growth axis direction and is within the range of 18.0±1 ppma (the conversion factor $f_c$=6.06; see T. Iizuka, S. Takasu, M. Tajima, T. Arai, M. Nozaki, N. Inoue and M. Watanabe "Conversion coefficient of IR measurement of oxygen in Si", *Defects in Silicon*, pp. 265-274, Electrochem. Society (1983)).

A planar silicon having a thickness of 7 mm in the growth axis direction was cut out with an off-angle (0, 11, 23, 35, 45 degrees) with reference to the crystal habit line which appears in the crystal growth axis direction of the single-crystalline silicon, and the planar silicon was further cut into thin rectangles with a width of 7 mm to form bars. Each of the silicon bars (core wires) obtained was a rectangular parallelepiped, of which the length was 1800 mm and each side of the section was 7 mm. The core wire was subjected to etching with a mixed solution of hydrofluoric acid and nitric acid so that a depth of 100 μm from the surface is etched off to remove the strain layer due to the cutting process, and thereafter the core wire was cleaned with ultrapure water and dried.

FIG. 3 summarizes the study result of an off-angle magnitude dependence upon the core wire strength, revealing that the core wires with off-angles of 11, 23, and 35 degrees show higher core wire strengths compared with the core wire with an off-angle of 0 degree in which the surface of the core wire is the {100} just surface and the core wire with an off-angle of 45 degrees in which the surface of the core wire is the {100} just surface. According to further investigation by the present inventors, it was revealed that the core-wire-strength enhancing effect by the off-angle is recognized in the range of 5 to 40 degrees.

Example 2

An attempt was made to manufacture a polycrystalline silicon rod by using a single-crystalline silicon core wire (with an off-angle of 23 degrees) fabricated by the method according to the above described in Example 1.

Figure 4:
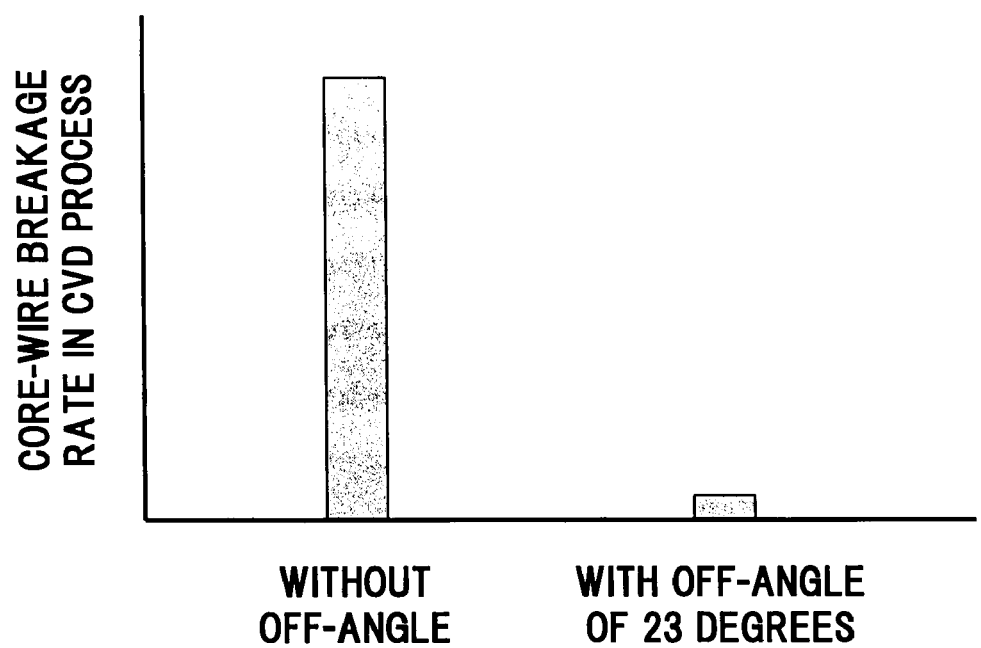
FIG. 4 summarizes the core-wire breakage rate during a CVD process with and without an off-angle.

FIG. 4 summarizes the core-wire breakage rate during a CVD process with and without an off-angle. It is seen that providing an off-angle decreases the core-wire breakage rate by not less than one order of magnitude.

Example 3

In the present example as well, a polycrystalline silicon rod was fabricated using a single-crystalline silicon core wire (with an off-angle 23 degrees) fabricated by a similar method as that of Example 1, and this polycrystalline silicon rod was used to grow a single-crystalline silicon by an FZ method. Moreover, for the purpose of comparison, a single-crystalline silicon was fabricated by an FZ method using a polycrystalline silicon rod which was grown using a conventionally known polycrystalline silicon core wire.

Figure 5:
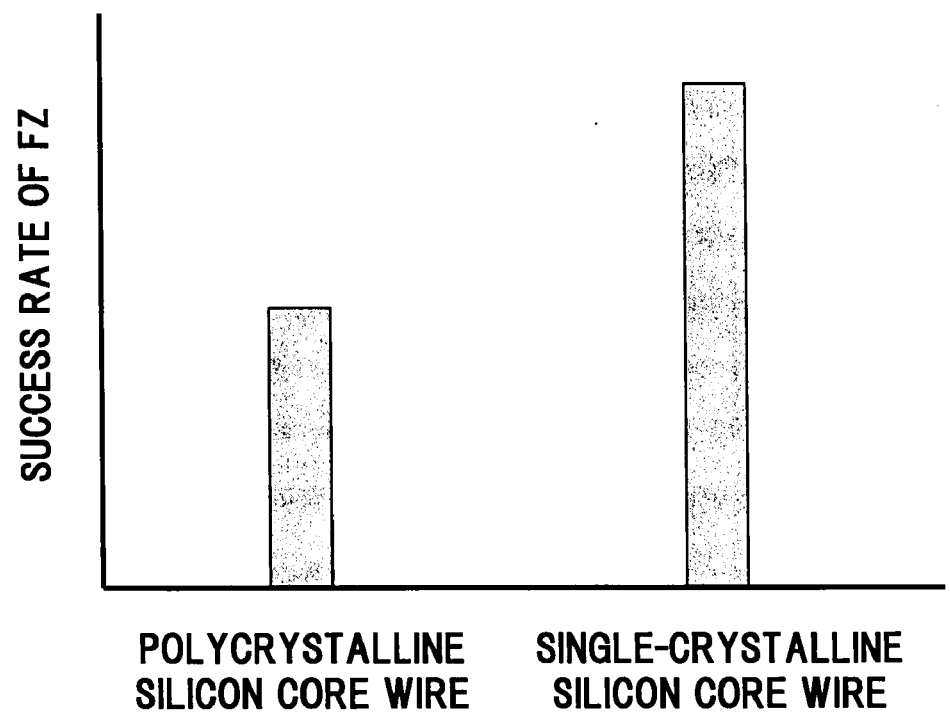
FIG. 5 shows the comparison of an FZ success rate of the polycrystalline silicon rod between the cases in which a polycrystal core wire and a single-crystalline core wire are used respectively.

FIG. 5 shows the comparison of an FZ success rate of the polycrystalline silicon rod between the cases in which a polycrystal core wire and a single-crystalline core wire are used respectively. As clearly seen from this figure, use of a polycrystalline silicon rod using a single-crystalline core wire improved the FZ success rate. That is, it is seen that the one-pass rate has been improved.

As so far described, the present invention provides a method to enable the manufacturing of a polycrystalline silicon rod which has a low impurity contamination (high purity) unobtainable by conventional methods and a polycrystalline silicon rod for FZ which has a high single-crystallization efficiency. The present invention further provides a method of manufacturing a polycrystalline silicon rod by use of a high-strength silicon core wire which is less likely to suffer a breakage caused by cleavage during the growing process of polycrystalline silicon by CVD.

What is claimed is:

1. A method of manufacturing a polycrystalline silicon rod, the method comprising depositing silicon on a silicon core wire by a chemical vapor deposition method,
wherein:
the silicon core wire comprises a silicon member which is cut out from a single-crystalline silicon ingot; and
the silicon member is cut out such that a side face of the silicon core wire forms an angle in a range of 5 to 40 degrees with respect to a crystal habit line of the single-crystalline silicon ingot.

2. The method of claim 1, wherein a surface of the silicon core wire is etched off by a removal amount of 50 μm to 200 μm after the silicon member is cut out from the single-crystalline silicon ingot.

3. The method of claim 1, wherein the depositing of the silicon by the chemical vapor deposition method is carried out in a gas atmosphere comprising trichlorosilane and hydrogen.

4. The method of claim 1, wherein the single-crystalline silicon ingot is grown by a Czochralski method and has an interstitial oxygen concentration of 7 ppma to 20 ppma.

5. The method of claim 4, wherein the interstitial oxygen concentration is not less than 17 ppma.

6. The method of claim 1, wherein:
the single-crystalline silicon ingot is grown by a Czochralski method or a floating zone method; and
the single-crystalline silicon ingot has a crystal growth axis orientation of <100> or <111> by a Miller index.

7. The method of claim 6, wherein a surface of the silicon core wire is etched off by a removal amount of 50 μm to 200 μm after the silicon member is cut out from the single-crystalline silicon ingot.

8. The method of claim 6, wherein the depositing of the silicon by the chemical vapor deposition method is carried out in a gas atmosphere comprising trichlorosilane and hydrogen.

9. The method of claim 6, wherein the single-crystalline silicon ingot is grown by a Czochralski method and has an interstitial oxygen concentration of 7 ppma to 20 ppma.

10. The method of claim 9, wherein the interstitial oxygen concentration is not less than 17 ppma.

* * * * *